Aug. 25, 1959 J. A. BAGNALL 2,900,802
CONTROL FOR REFRIGERATOR
Filed July 12, 1955 4 Sheets-Sheet 1

Inventor,
James A. Bagnall,
by Townsend M. Green.
Att'y.

Aug. 25, 1959  J. A. BAGNALL  2,900,802
CONTROL FOR REFRIGERATOR
Filed July 12, 1955  4 Sheets-Sheet 2

Inventor,
James A. Bagnall,
by Townsend M. Gunn
Att'y.

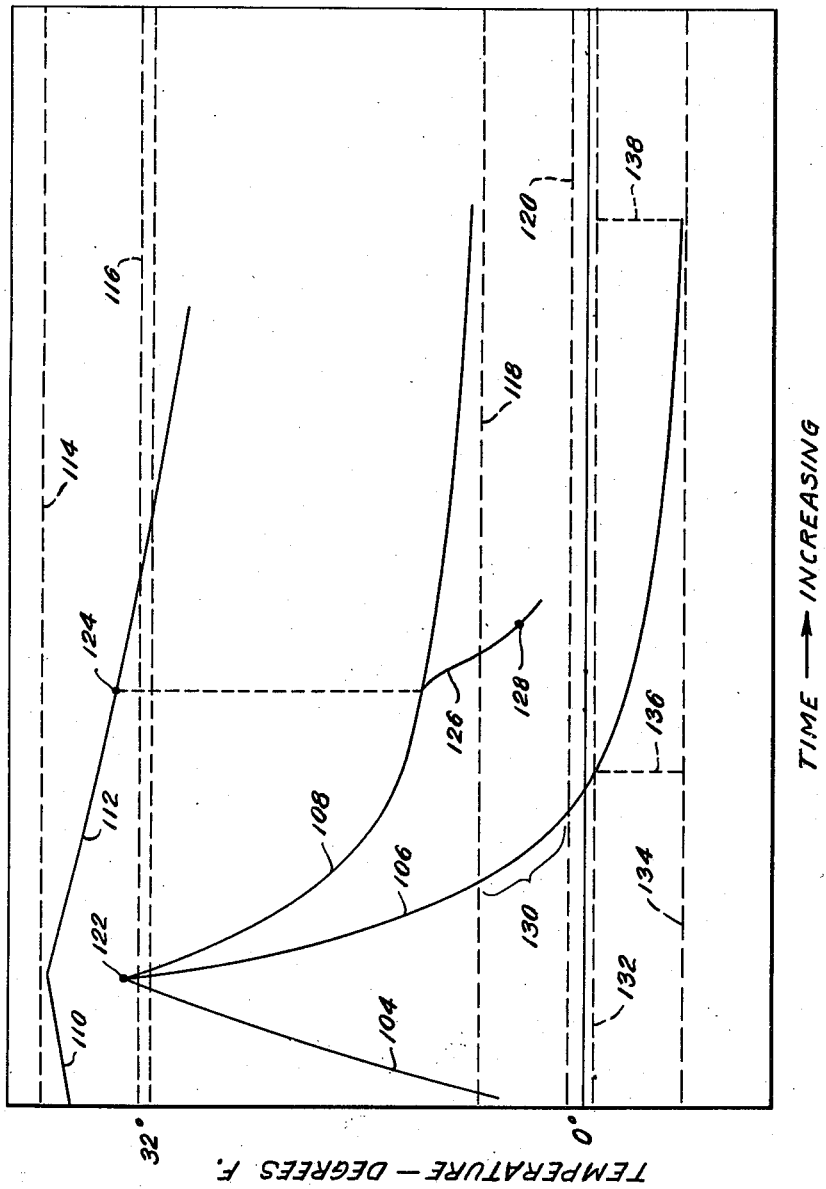

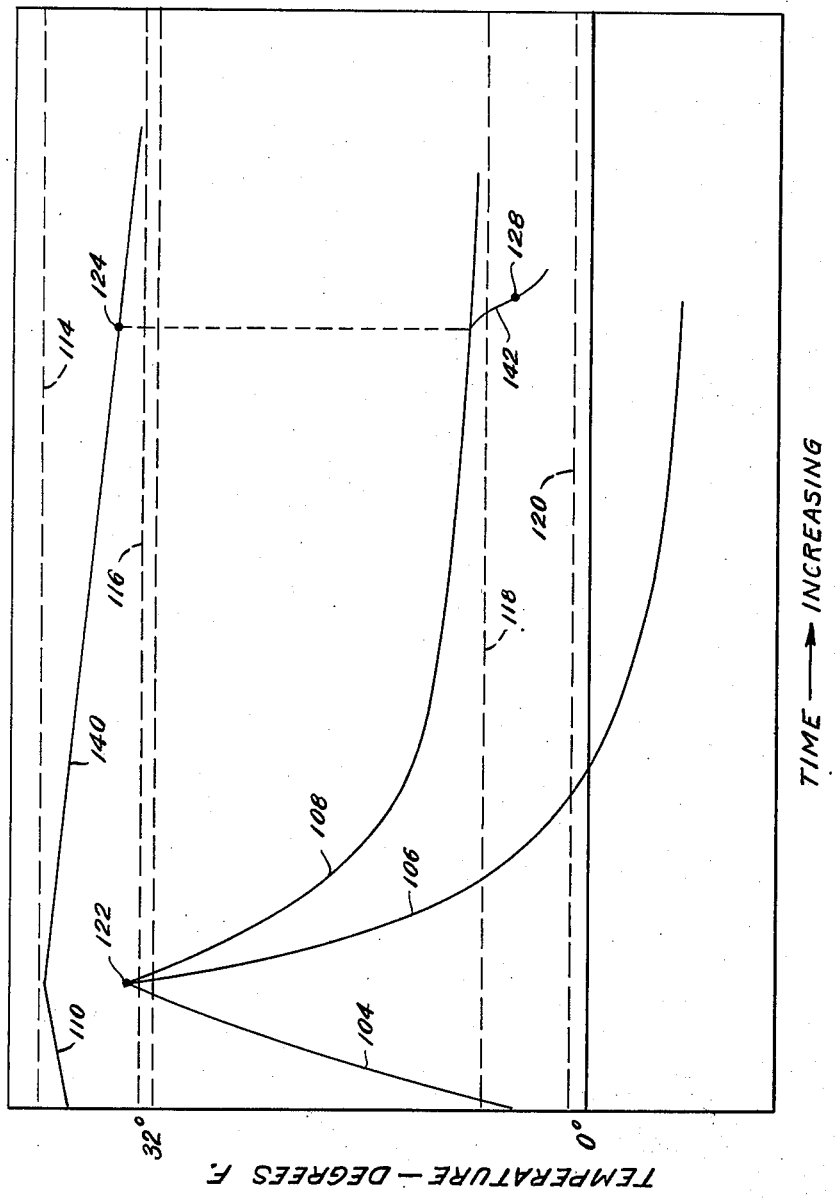

United States Patent Office 2,900,802
Patented Aug. 25, 1959

2,900,802

CONTROL FOR REFRIGERATOR

James A. Bagnall, Dearborn, Mich., assignor to Texas Instruments Incorporated, Attleboro, Mass., a corporation of Massachusetts Application July 12, 1955, Serial No. 521,610

17 Claims. (Cl. 62—156)

This invention relates to control apparatus for refrigerators, particularly to that kind of a refrigerator in which it is desired to defrost an evaporator automatically and yet maintain the desired temperature in the food compartments.

The system is applicable to any refrigerator having an evaporator and means for circulating refrigerant through said evaporator. It has particular adaptability to those refrigerators having a plurality of food compartments, one of which is used for storage of frozen foods, and the other of which is used for the storage of non-frozen foods, because it enables a better control of the temperature of the last-named compartment (hereinafter called the food compartment) of the refrigerator without disturbing the desirable low temperature of the freezer compartment, while at the same time permitting and controlling automatic defrosting of the evaporator within the food compartment.

Among the several objects of the invention may be noted the following:

The provision of control apparatus for refrigerators which has the effect of reducing the adverse effects of the variables which influence the food compartment temperatures;

The provision of control apparatus for refrigerators which makes possible the use of a wide tolerance thermally responsive means for controlling the defrosting of the evaporator within the food compartment;

The provision of control apparatus for refrigerators which utilizes a pair of thermally responsive means, one of said means being under the control of the other so that the one can start the compressor independently of the other, but can stop the compressor only under the influence of said other;

The provision of control apparatus for a multiple temperature refrigerator, which will defrost an evaporator at every cycle and yet at the same time maintain the food compartment temperature in the selected temperature range;

The provision of control apparatus for refrigerators, embodying two thermostats, one of which first acts as a control thermostat and then acts as a thermal relay under the influence of a second thermostat to perform certain control operations; and The provision of simple control apparatus for refrigerators, which has great flexibility in its application to a given refrigerator system, and which uses relatively low cost thermally responsive means.

Other objects and advantages of the invention will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In most refrigerators that are in use today, particularly those of the kind used in homes, there are many things which influence the food compartment temperatures, particularly in systems using one compressor and multiple compartments for storing food. Among these may be listed the following: Compressor components variables; compressor charge variations; line voltage variations; room temperature variations; box loading, that is, both the number and heat mass of the objects of food and dishes added or removed from the food compartment, and their temperatures; frequency of door openings; the effects of altitude; and the defrost thermostat tolerances, that is, the spread of the temperature responses of that thermostat which controls the starting and stopping of the refrigerant circulating means. The control apparatus to be described herein is such as to reduce the adverse effects of these variables, which will be apparent from an understanding of the manner in which the control apparatus works as described below. In general, the apparatus of this invention will defrost the evaporator in one part of every cycle, and yet in the other part of the cycle will maintain the food compartment temperature in the selected temperature range.

In addition to the above, the invention has the great advantage that when a heavy heat load is placed in the refrigerator, or in those cases where the interior of the refrigerator has been allowed to warm up (for example, during the time that the refrigerator is being washed or during initial pull-down), the refrigerator compressor is allowed to run continuously until the food compartment temperature has been brought down to the desired value, this being done in a relatively short time. This contrasts with the performance of many of the present day domestic refrigerators in which the food compartment temperature under such conditions drops slowly because of intermittent operation of the refrigerant compressor.

Basically, the apparatus comprises two thermally responsive means, one of which is mounted on the evaporator. This means directly starts and stops the refrigerant circulating means, and is the means that controls the defrosting of the evaporator.

The apparatus is so arranged that this thermally responsive means can start the refrigerant circulating means (such as a compressor), but under the usual temperatures encountered in a refrigerator, it cannot stop the circulating means until permitted to do so by a second thermally responsive means.

In the preferred embodiment, this is done by maintaining the temperature of the thermal element of the first thermally responsive means higher than the temperature of the evaporator (while the refrigerant circulating means is operating) than would otherwise be the case.

It can also be done, for example, by having the second thermally responsive means mechanically bias the first thermally responsive means (either directly or indirectly) in such a direction as to prevent the latter from stopping the refrigerant circulating means until the second thermally responsive means is satisfied as to temperature. Another way, particularly where the first thermally responsive means actuates electrical contacts to start and stop the refrigerant circulating means, is to have the second thermally responsive means move one of said contacts a sufficient distance to prevent the first thermally responsive means from breaking the electrical circuit established between said contacts.

In the preferred embodiment, as indicated, the first method of using heat is chosen, and an auxiliary electrical heater is placed near the thermal element of the first thermally responsive means. This first thermally responsive means is mounted on the evaporator and is called the evaporator thermostat. Thus, the evaporator thermostat responds directly to the temperature of the evaporator but, because of the artificial or false "warm" ambient temperature caused by the electrical heater within the thermally responsive means, the compressor must run long enough to cool the evaporator down to a temperature lower than otherwise would be necessary, before this evaporator thermostat will stop it. Preferably, but not necessarily, enough additional heat is provided by the electrical heater to prevent the evaporator thermostat from stopping the refrigerant circulating means (within the capacity thereof) until the electrical heater is, in turn, shut off.

The electrical heater above referred to is under the control of the second thermally responsive means called the food compartment thermostat, and this thermostat is responsive to the effective temperature in the food compartment.

In the preferred embodiment described in this application, the two thermally responsive means are shown as separated but operatively connected together electrically by means of conducting wires. However, it is not necessary for these thermally responsive means so to be separated. Instead, a single unit may be constructed having the two thermally responsive means shown herein, and the unit is then mounted on the evaporator so that the one thermal element is closely adjacent to the evaporator and therefore responsive to its temperature, but the other thermal element is remote from the evaporator so as to be responsive to the effective temperature in the food compartment. Again, as described above, the second thermal element may control a heater which influences the first thermal element, or the control may be established by the aforesaid mechanical biasing or motion of electrical contacts.

In the accompanying drawings:

Fig. 4 is a graph illustrating operating performance of the invention under one set of circumstances; and Fig. 5 is a graph illustrating operating performances of the invention under a second set of circumstances.

Similar reference characters indicate corresponding parts throughout the several views of the drawings.

Figure 1:
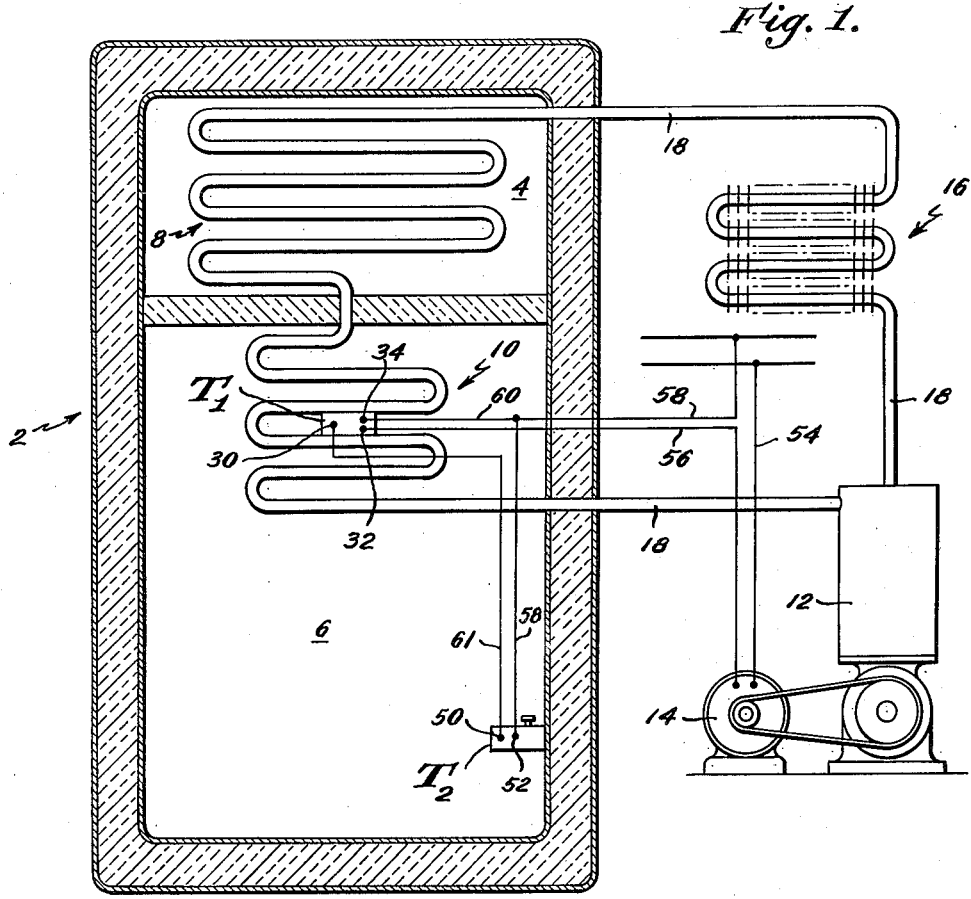
Fig. 1 is a schematic view of a refrigerator showing the evaporator coils, the condenser, the motorized compressor, and the apparatus of the present invention installed therein.

Referring to Fig. 1, there is shown generally by numeral 2 a refrigerator containing the freezer compartment 4, and the food compartment 6. In the freezer compartment are the evaporator coils 8, and in the food compartment are the evaporator coils 10. As indicated, these are drawn in schematic form and hereinafter coils 10 will be referred to as the evaporator. A compressor 12 is shown schematically together with its driving motor 14. A condenser 16 is indicated schematically, and the necessary conduits 18 connect these several parts. Two thermostats $T_1$ and $T_2$ are provided in the food compartment, thermostat $T_1$ being preferably mounted close to or directly on the evaporator 10 and thermostat $T_2$ being mounted remotely from the evaporator.

Figure 2:
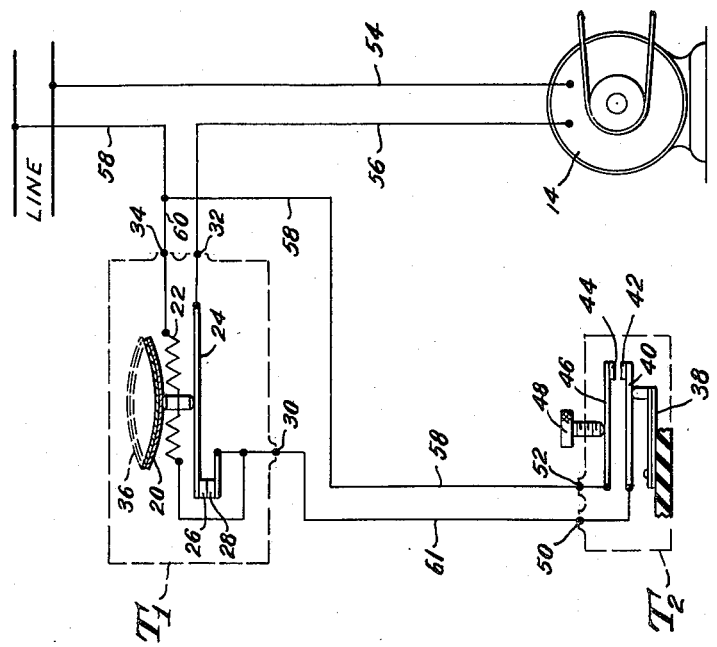
Fig. 2 is a schematic wiring diagram showing the connections for one embodiment of the invention.

Referring now to Fig. 2, $T_1$ is a thermostat having the snap-acting thermostat element 20 and constructed as shown in United States Patent No. 2,667,553 except for the inclusion of electrical heater 22. Briefly described, element 20 is made of thermostatic bimetal and is made in accordance with United States Patent No. 1,448,240. The bimetal element 20 is mounted at its perimeter, and the center is free to snap upwardly and downwardly to actuate the switch arm 24 to open and close the electrical contacts 26 and 28. Terminals 30, 32, and 34 connect respectively with contact 28, contact 26 (via switch arm 24), and one end of heater 22. The other end of heater 22 also connects to terminal 30. Bimetallic element 20 is so constructed and mounted that it snaps to the position shown by the dotted lines 36 upon cooling to a predetermined temperature, and snaps to the full lines drawn upon warming up to a predetermined temperature. Thus on cooling, the bimetallic element snaps to open the electrical circuit between contacts 26 and 28. (It is understood, of course, that instead of using the snap-acting element 20, other types of thermostats may be used. However, for ultimate safety from the viewpoint of preserving the food in the refrigerator, particularly the food in the frozen food compartment, it is highly desirable that thermostat $T_1$ have a wide temperature differential.)

A second thermostat, $T_2$, is shown, comprising a creep-type bimetallic element 38 (or other narrow temperature differential bimetallic element) which actuates the movable switch arm 40 in conventional manner. An electrical contact 42 is mounted at the end of switch arm 40 and engages another electrical contact 44 which in turn is mounted on the adjustable switch arm 46. An adjusting screw 48 is provided to move switch arm 46 and thus contact 44 in relation to contact 42, thus changing the temperature at which thermostat element 38 will open and close said contacts. Bimetallic element 38 is so mounted in this embodiment that it moves to separate the electrical contacts upon being heated, and moves to close contacts 42 and 44 upon being cooled. The terminals 50 and 52 are provided to which internal electrical connections are made, respectively, from switch arms 40 and 46.

Circuit connections are as follows: A source of power, for example 110 volt A.C., is provided and indicated by the word Line. Wire 54 connects one side of the Line to the motor 14. The other side of motor 14 is connected by means of wire 56 to terminal 32 (and thus to switch arm 24 and electrical contact 26). The other side of the Line is connected by means of wires 58 and 60 to terminal 34 (and thus to one end of heater 22). Wire 58 is also connected to terminal 52 (and thus to switch arm 46 and electrical contact 44). Terminal 30 (and thus the other end of heater 22 and contact 28) is connected by wire 61 to terminal 50 (and thus to switch arm 40 and electrical contact 42).

Figure 3:
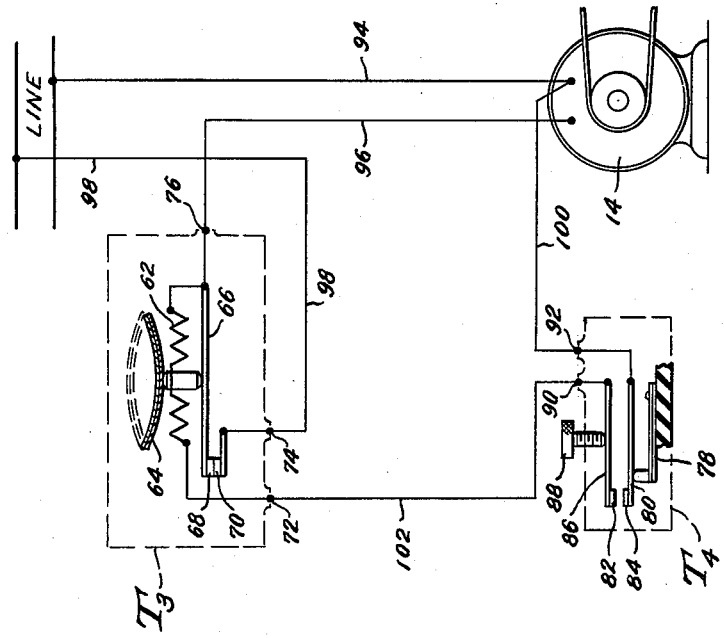
Fig. 3 is a schematic wiring diagram showing the connections for another embodiment of the invention.

Referring now to Fig. 3, there is shown another embodiment of the invention in which thermostats $T_3$ and $T_4$ are used. The construction of thermostat $T_3$ is the same as the construction of thermostat $T_1$, except for the manner in which the internal heater 62 is connected in the circuit. That is, the thermostat element 64 of thermostat $T_3$ is the same as the thermostat element 20 of thermostat $T_1$ and is mounted to operate in the same fashion. The switch arm 66 is the same as switch arm 24, and the electrical contacts 68 and 70 correspond to the electrical contacts 26 and 28. Terminals 72, 74, and 76 are provided, and internal connections in thermostat $T_3$ to these terminals are as follows: One end of heater 62 is connected electrically to terminal 72 as shown. Electrical contact 70 is connected as shown to terminal 74. The other end of heater 62 and electrical contact 68 (via switch arm 66) are connected as shown to terminal 76.

Thermostat $T_4$ is constructed in general the same as thermostat $T_2$. It has the creep-type thermostatic element 78, the movable switch arm 80, the electrical contacts 82 and 84, and the adjustable switch arm 86, which can be moved by the adjusting screw 88. In this thermostat, however, the bimetal element is mounted so as to separate the contacts 82 and 84 upon being cooled, and to close said contacts upon being heated. Terminals 90 and 92 are provided which are internally connected, respectively, to the switch arms 86 and 80 and thus to the electrical contacts 82 and 84. The electrical connections for this Fig. 3 embodiment are as follows:

Again, the power supply is indicated by the word Line, and a wire 94 connects one side of the Line to the motor 14. Wire 96 connects the other side of the motor to terminal 76 (and thus to one side of heater 62 and the switch arm 66 and electrical contact 68). The other side of the Line is connected by wire 98 to terminal 74 and thus to electrical contact 70.

Wire 100 connects wire 94 to terminal 92 and thus by way of switch arm 80 to contact 84. Terminal 72 (and thus the other end of heater 62) is connected by wire 102 to terminal 90 (and thus to switch arm 86 and electrical contact 82).

As an example of the operation of the device, a cycle of operations for an electric refrigerator is as follows, using the Fig. 2 connections:

In explaining the operation of the system, there will first be described the normal cycle of operations in that situation where the box has already been in operation, and the apparatus is operating to maintain a given preselected box temperature. Referring to Fig. 4, there is shown a set of curves which illustrate the operation. The graph has temperature in degrees Fahrenheit as ordinates, and time as the abscissa. Curves 104 and 106 illustrate the rise and fall, respectively, of the evaporator temperature, and curve 104 will be the rise in temperature of thesmostat $T_1$, since the latter is so mounted as to be closely responsive to the temperature of the evaporator 10. Curve 108 is the fall in temperature of thermostat $T_1$ under the combined influence of the evaporator temperature and the heater 22. Curves 110 and 112 represent the rise and fall of the food compartment temperature and thus of the thermostat $T_2$. Dotted lines 114 and 116 represent the top and bottom limits of adjustment of the thermostat $T_2$, and dotted lines 118 and 120 represent the manufacturing tolerance which may be encountered as to the contact opening temperature of a fixed temperature thermostat such as $T_1$.

Assuming that thermostat $T_1$ has its contacts open so that the compressor 12—14 is not running, and assuming also that the contacts of thermostat $T_2$ are open so that heater 22 is in position to be traversed by current to the motor 14 when the latter is energized, then the evaporator temperature is rising along the curve 104, and the box temperature is rising along the curve 110. The evaporator temperature rises until point 122 is reached, at which point thermostat $T_1$ closes its contacts and energizes the motor 14 and compressor 12. This begins to chill the evaporator, and supplies current to heater 22. The evaporator temperature falls along the curve 106. Because of the chilling of the evaporator, the food compartment temperature also begins to fall along the curve 112. However, the temperature of the thermal element of $T_1$ falls along curve 108 because of the influence of the heater 22 which is traversed by the motor current, and which maintains the temperature of this thermal element above the evaporator temperature and also above line 118. (Without such a heater, the temperature curve of the thermal element of $T_1$ would follow approximately curve 106, that is, would be close to the temperature of the evaporator). This cooling cycle continues until the thermostat $T_2$ reaches the temperature indicated by point 124, for example, which is preselected by means of adjusting screw 48. At this point, the contacts of thermostat $T_2$ close, thus shunting the heater 22 to decrease greatly the current through it. Heater 22 immediately cools, with the result that the temperature of the thermal element of thermostat $T_1$ falls quickly along curve 126. At point 128, between dotted lines 118 and 120, this point 128 representing the actual contact-opening temperature obtained in manufacturing the contacts of thermostat $T_1$ open to stop the compressor. The cycle now repeats itself on curve 104 beginning with point 128, the evaporator rising again to point 122 where it defrosts (it will be noticed that this point is above the freezing point) and the food compartment temperature rising and falling as indicated.

It will now be observed that the manufacturing tolerance of the contact-opening temperature of thermostat $T_2$ may be quite wide (as illustrated by the dotted lines 118—120), but that the range of this temperature is so set that it lies on a relatively steep portion 130 of curve 106. Also, it is to be noticed that the amount of heat added by means of heating element 22 is such as to maintain the fall of temperature of the thermal element of thermostat $T_1$ (that is, curve 108) above the range of temperature 118—120. The result of this is that very rapidly after thermostat $T_2$ closes its contacts, the temperature of $T_1$ falls to open its contacts. Since this fall (illustrated by curve 126) is very rapid, the time elapsed from the time at which the contacts of $T_2$ close to the time at which contacts of thermostat $T_1$ open is short, even though the temperature tolerance of thermostat $T_1$ is large.

To understand this better, an explanation of what would happen with the use of the same wide temperature range of thermostat $T_1$ but without the heater 22, will be of assistance. In that case the contact-opening temperature of thermostat $T_1$ might have to be set, for example, in manufacturing to a position between the dotted lines 132 and 134, and with such a wide range of temperature, it is to be noticed that the time at which shut-off would occur extends from vertical dotted line 136 to 138, depending on the particular thermostat used and the variables in the refrigerator itself. This means that the box temperature itself may well go below freezing, which is an undesirable feature. Or, the box temperature may not drop enough to preserve food. Also, the food compartment temperature is governed by the operation of the evaporator thermostat; whereas in this invention, $T_2$ can control the length of the cooling portion of the compressor cycle if temperature conditions in the food compartment demand that it do so. Therefore, it is apparent that by setting the temperature range 118—120 in that portion of curve 106 that is falling rapidly, and by maintaining the temperature of thermostat $T_1$ above the evaporator temperature (as illustrated by curve 108) during a cooling cycle, it is possible to use a wide range of temperatures for the thermostat $T_1$ at which it will open its contacts, and this means a relatively inexpensive construction for thermostat $T_1$. Furthermore, it will be noticed that once the contacts of $T_1$ have opened to stop the compressor under the influence of $T_2$, those contacts will remain open until the evaporator 10 has warmed sufficiently to defrost. Once defrost has been accomplished, a cooling cycle follows, the duration of which is determined by $T_2$ if food compartment temperature conditions so demand. If the temperature of the food compartment is such as to satisfy $T_2$, then the compressor will automatically cycle within limits determined by the opening and closing temperatures of $T_1$ to provide the minimum refrigeration required.

A further point to be noticed in respect to this invention is the function of thermostat $T_1$. On a rise in temperature to the defrost point, thermostat $T_1$ acts as a control thermostat to control the temperature at which the compressor is again started to chill the evaporator. However, after the compressor is started, then thermostat $T_2$ is not satisfied, and thermostat $T_1$ acts as a thermal relay under the control of thermostat $T_2$ to shut off the compressor.

The other situation which illustrates one of the chief advantages of the invention is where the box has been shut off for such a period of time that the whole box, including the food compartment, has risen, for example, to room temperature. In other systems commonly encountered, when such a refrigerator is first started in order to cool it to the point that it is safe to store food therein, it has been experienced that it requires up to 10 hours, depending on load conditions, to bring the food compartments down to an acceptable refrigeration temperature. The reason for this is seen by an examination of chart Fig. 4 under the assumption that the evaporator thermostat $T_1$ has no heater therein and therefore follows the curve 106. When the compressor of such a prior art system runs, the evaporator cools very rapidly to the point (within lines 118 and 120) that the thermostat T₁ opens its contacts and shuts off the compressor. Because of the short duration of this cooling cycle, the evaporator plate does not have sufficient time to cause the food compartment temperature to drop very much. The evaporator now warms up until the compressor is again started, and this cycling on and off continues until the food box temperature is gradually reduced to the required point. The time taken to reach this temperature, therefore, is increased directly by the number of defrosting periods of the evaporator plate, and this number can be quite extensive.

However, in the present invention, it is to be noticed that in such a situation, thermally responsive means $T_1$ is not permitted to shut off the compressor until thermally responsive means $T_2$ is satisfied that the food compartment temperature is at the preselected value. The compressor is therefore kept running steadily until the food compartment temperature drops to that value at which the contacts of thermally responsive means $T_2$ close to permit thermally responsive means $T_1$ to assume rapidly the evaporator temperature within lines 118—120, and thus stop the compressor. As a further example of the manner in which the present invention adjusts itself to various heat loads in the refrigerator, there is shown in Fig. 5 a chart similar to that of Fig. 4, but in which the drop in temperature of the food compartment is represented by curve 140, this being of less slope than the curve 112 of Fig. 4, and therefore the point 124 at which the heater of the thermostats $T_1$ and $T_3$ is shut off occurs much later in time. Such a flatter curve would be caused by, for example, a higher ambient surrounding the outside of the refrigerator, or a greater heat load in the form of warm food, etc., being placed in the refrigerator. Again, however, it will be observed that when point 124 is reached, the heater in the thermostats $T_1$ and $T_3$ is deenergized, and thus the thermostats immediately start cooling rapidly along curve 142 instead of following curve 108, until point 128 is reached, at which time the compressor stops and the cycle repeats itself.

The operation of the Fig. 3 embodiment is the same as described above except in the manner in which heater 60 is controlled. In this embodiment, it will be noticed that the heater 62 is connected in parallel with the motor 14 but is separately under the control of thermostat $T_4$. It has already been mentioned that the thermostat element 78 of thermostat $T_4$ is mounted and operates to close the electrical circuit between contacts 82 and 84 upon a rise in temperature. On a fall in food compartment temperature this electrical circuit is broken. Therefore, so long as the temperature of the food compartment is above the point 124, for example, and the motor 14 is running, the heater 62 is energized and heats element 64 of thermostat $T_3$. When the food compartment temperature reaches the selected point 124, however, the electrical circuit between contact 82 and 84 is broken, thus breaking the connection to heater 62, and the latter cools, thus permitting thermostat $T_3$ to cool quickly to, for example, point 128 to stop the motor and compressor.

Again, as in the Fig. 2 embodiment, thermostat $T_3$ acts as a temperature control thermostat on a warm-up portion of a cycle, but as a thermal relay under the control of thermostat $T_4$ on the cooling portion of the cycle, where the food compartment temperature is above the temperature for which thermostat $T_4$ is set.

A further point to be noticed is that the operating time of the compressor, or other refrigerant circulating means, is automatically adjusted to match the heat load of the refrigerator. If the load is light, so that the food compartment temperature remains steady at the value for which the thermostat $T_2$ (or $T_4$) is set, the compressor cycles automatically in a cycle timed by curves 104 and 106 as determined by the temperature setting of thermostat $T_1$ or thermostat $T_3$. However, if the heat load increases, thermostats $T_2$ and $T_4$ come into play to cause the compressor to run long enough to bring the average food compartment temperature down to the selected value as determined by the settings of these thermostats.

It is also to be noted that in both embodiments, the heating means (heaters 22 and 62) are under the control of both thermostats of the particular embodiment. It has already been detailed how the thermostats $T_2$ and $T_4$ control the respective heaters 22 and 62. However, inasmuch as thermostats $T_1$ and $T_3$ control their respective compressor motors, and since the heaters are either in series with or in parallel with the respective motors, it is apparent that the operation of these two thermostats also controls the operation of the heater. This means that under all circumstances, the warm-up period must continue until the defrost point 122 is reached, and will not be cut short by a premature operation of heaters 22 and 62.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. A control for a refrigerator having at least one evaporator together with refrigerant circulating means therefore, comprising first means thermally responsive to the temperature of said evaporator and adapted to be mounted so as to be in close temperature relationship therewith for controlling the operation of said refrigerant circulating means; second means for raising the temperature of said first means above the temperature of said evaporator; and third means thermally responsive to the temperature of the air in said refrigerator for controlling the operation of said second means.

2. The control of claim 1 in which said first means has a temperature differential relatively wide compared to the temperature differential of said third means.

3. The control of claim 1 in which said first means operates at fixed temperatures, and in which said third means is adjustable as to the temperature at which it operates.

4. A combined defrosting and box temperature control system for a refrigerator having at least one evaporator together with refrigerant circulating means therefor, comprising first thermostatic control means having a thermal element therein responsive to the temperature of said evaporator and adapted to be mounted in close temperature relationship therewith for controlling the operation of said refrigerant circulating means; electrical heating means operatively associated with said thermostatic control means for heating the thermal element thereof; and second thermostat control means responsive to the temperature of the air in the refrigerator for controlling operation of said electrical heating means.

5. A control for a refrigerator having at least one evaporator together with refrigerant circulating means therefor, comprising first thermostatic control means having electrical contacts and a thermostat element positioned to move said contacts in relation to each other to open and close an electrical circuit to said refrigerant circulating means, said thermostatic element being responsive to the temperature of said evaporator; heating means for heating said thermostat element; and second thermostat control means responsive to the temperature of the air in the refrigerator for controlling operation of said heating means.

6. A control for a refrigerator having at least one evaporator together with refrigerant circulating means therefor, comprising first thermostatic switch means having incorporated therein electrical contacts for making and breaking an electrical circuit to said refrigerant circulating means, and a first thermostat element positioned to move said contacts, said thermostatic switch means being adapted to be mounted in close thermal relation to the temperature of said evaporator; heating means for heating said first thermostat element; and second thermostatic switch means having electrical contacts movable in relation to each other for making and breaking an electrical circuit, together with a second thermostat element for controlling the relative motion of said contacts, said second thermostat element being responsive to the temperature of the air in said refrigerator and controlling the operation of said heating means.

7. The control of claim 6, in which said first thermostatic switch means operates with a relatively wide temperature differential at fixed temperatures, and in which said second thermostatic switch means is adjustable as to the temperature at which it operates and has a temperature differential small in comparison to that of said first thermostatic means.

8. A control for a refrigerator having at least one evaporator together with refrigerant circulating means therefor, comprising first thermostatic control means adapted to be mounted in close thermal relationship to said evaporator; an electrical heater for heating said first thermostatic control means above the temperature of said evaporator, said heater being traversable by electrical current only when said refrigerant circulating means is energized; and second thermostat control means responsive to the temperature of the air in the refrigerator for controlling the deenergization, at least in part, of said heater independently of the energization of said refrigerant circulating means.

9. A control for a refrigerator having at least one evaporator together with refrigerant circulating means therefor, comprising first thermostatic control means adapted to be mounted closely adjacent to said evaporator and responsive to the temperature thereof for controlling the operation of said refrigerant circulating means; an electrical heater for heating said first thermostatic control means above the temperature of said evaporator, said heater being traversable by electrical current only when said refrigerant circulating means is energized; and second thermostat control means responsive to the temperature of the air in the refrigerator for controlling operation of said electrical heater, said second thermostatic control means having a thermally responsive element and electrical contacts controlled thereby for making and breaking an electrical circuit, said electrical contacts being conneted in series with said heater thereby to stop the flow of electrical current in said heater when said contacts are open.

10. A control for a refrigerator having an evaporator together with refrigerant circulating means therefor, comprising first thermostatic control means adapted to be mounted closely adjacent to said evaporator and responsive to the temperature thereof for controlling the operation of said refrigerant circulating means; an electrical heater for heating said first thermostatic control means, said electrical heater being traversable by electrical current only when said refrigerant circulating means is energized; and second thermostatic control means responsive to the temperature of the air in said refrigerator for controlling operation of said heater, said second thermally responsive means having a thermostat element and electrical contacts controlled thereby for making and breaking an electrical circuit, said electrical contacts being connected across said electrical heater, thereby to shunt said heater when said contacts are closed.

11. A control for a refrigerator having an evaporator, together with refrigerant circulating means therefor, comprising a first thermostatic switch having a snap-acting thermostat element therein and first electrical contacts moved thereby for making and breaking an electrical circuit, together with an electrical heater positioned to heat said snap-acting element when said heater is energized; and a second thermostatic switch having a thermostatic element and second electrical contacts adapted to be moved thereby, together with means for adjusting said thermostatic element to govern the temperatures at which said second electrical contacts make and break an electrical circuit; said first thermostatic switch being adapted to be mounted in close thermal relationship to said evaporator and responsive to the temperature thereof, and said second thermostatic switch being adapted to be mounted remotely from said evaporator and responsive to the temperature of the air in the food compartment of the refrigerator; said second electrical contacts being connected across said heater thereby to shunt said heater when said second contacts are closed; and said first electrical contacts being adapted to be connected between a power source and said refrigerant circulating means and said heater, whereby said refrigerant circulating means is adapted to be energized when said first contacts are closed, and said electrical heater is connected to be traversable by electrical current.

12. A control for a refrigerator having an evaporator, together with refrigerant circulating means therefor, comprising a first thermostatic switch having a snap-acting thermostat element therein and first electrical contacts moved thereby for making and breaking an electrical circuit, together with an electrical heater positioned to heat said snap-acting element when said heater is energized; and a second thermostatic switch having a thermostatic element and second electrical contacts adapted to be moved thereby, together with means for adjusting said thermostatic element to govern the temperatures at which said second electrical contacts make and break an electrical circuit; said first thermostatic switch being adapted to be mounted in close thermal relationship to said evaporator and responsive to the temperature thereof, and said second thermostatic switch being adapted to be mounted remotely from said evaporator and responsive to the temperature of the air in the food compartment of the refrigerator; said second electrical contacts being connected in series with said heater thereby to connect and disconnect said heater from a source of electrical power; and the electrical contacts of said first thermostatic switch being adapted to be connected between a power source and said refrigerant circulating means and said heater whereby said refrigerant circulating means is adapted to be energized when said first contacts are closed, and said heater is adapted to be energized when both said first and second contacts are closed, but not when said second contacts are open.

13. In a refrigerator including a refrigerated compartment and an electric compressor motor operative to supply refrigerant to an evaporator in said compartment and including an electrical control circuit for starting and stopping the motor, control devices in said electrical circuit comprising: a first temperature responsive switch mounted adjacent the evaporator, directly responsive to evaporator temperatures, and operable to de-energize the motor at a predetermined low evaporator temperature; a heating means in the electrical circuit mounted adjacent the first switch for directly influencing the operation of the switch; and a second temperature responsive switch in the electrical circuit located in said compartment and responsive to a local compartment temperature but not to the evaporator temperatures and effective to control the operation of the heating means to influence the first switch whereby the compressor motor is maintained operative even though said predetermined low evaporator temperature has been reached.

14. A device for controlling air temperature within a food storage compartment of a household refrigerator, said compartment having pockets of warm air therein, comprising means including an evaporator and a compressor motor for refrigerating the compartment generally; a first thermostatic switch positioned in said compartment directly responsive to the temperature of the evaporator and operable to control the compressor motor; a heater in said compartment and adapted to influence the operation of the first switch; a second thermostatic switch positioned within said compartment and disposed in the region of one of said pockets of warm air; said second switch being responsive to the temperature of said warm air and operable to energize the heater whereby the first switch is precluded from responding to the temperature of the evaporator.

15. In a refrigerator including a refrigerated compartment and an electric compressor motor operative to supply refrigerant to an evaporator in said compartment and including an electrical control circuit for starting and stopping the motor, control devices in said electrical circuit comprising: a first temperature responsive switch disposed in said compartment, directly responsive to evaporator temperatures and operable to energize the motor at a predetermined high evaporator temperature and to deenergize the motor at a predetermined low evaporator temperature; a heating means in the electrical circuit mounted adjacent the first switch for directly influencing the operation of the switch; and a second temperature responsive switch in the electrical circuit located in said compartment and responsive to a local compartment temperature but not to the evaporator temperatures and effective to energize the heating means whereby the first switch is warmed and the compressor motor is maintained operative even though said predetermined low evaporator temperature has been reached.

16. In a refrigerator having at least one compartment for storing material to be refrigerated and having an evaporator in said compartment for refrigerating air contained therein, a cold control device comprising: a means for cooling the evaporator, and including an electric compressor motor, a first thermostatic switch disposed in the compartment and operative in response to a predetermined low evaporator temperature to render the motor inoperative; a heater associated with the first switch and operable to heat said switch and a localized portion of said evaporator; and a second thermostatic switch disposed in the compartment for operating said heater whereby said cooling means is maintained operative even though said evaporator generally has been cooled below said predetermined temperature.

17. In a refrigerator having at least one compartment for storing perishables and having an evaporator in said compartment for refrigerating air contained therein, a cold control device comprising: means for cooling the evaporator; a first thermostatic switch mounted upon the evaporator at a predetermined location, said first switch being under the influence of the temperature of said evaporator and operative in response to a first predetermined low temperature to render the cooling means inoperative; a heater incorporated in said switch and operable to maintain the temperature of said switch above said predetermined temperature whereby said cooling means remains operative, even though the temperature of said evaporator generally falls below said predetermined temperature, and a second thermostatic switch located remotely with respect to the first switch and operable in response to a second predetermined low temperature to render said heater inoperative whereby the predetermined location of the evaporator is permitted to fall below said first predetermined temperature thus rendering the cooling means inoperative.

References Cited in the file of this patent

UNITED STATES PATENTS

| | | |
|---|---|---|
| 1,448,240 | Spencer | Mar. 13, 1923 |
| 1,942,412 | Dienner et al. | Jan. 9, 1934 |
| 2,048,711 | Ridge | July 28, 1936 |
| 2,049,413 | Cannon | Aug. 4, 1936 |
| 2,159,658 | Hall | May 23, 1939 |
| 2,266,799 | Raney | Dec. 23, 1941 |
| 2,471,924 | Bolesky | May 31, 1949 |
| 2,519,700 | Radcliffe | Aug. 22, 1950 |
| 2,531,136 | Kurtz | Nov. 21, 1950 |
| 2,667,553 | Moorhead et al. | Jan. 26, 1954 |

UNITED STATES PATENT OFFICE

CERTIFICATE OF CORRECTION

Patent No. 2,900,802                                   August 25, 1959

James A. Bagnall

It is hereby certified that error appears in the above numbered patent requiring correction and that the said Letters Patent should read as corrected below.

In the grant, lines 2 and 3, for "assignor to Texas Instruments Incorporated, of Attleboro, Massachusetts, a corporation of Massachusetts," read -- assignor to Texas Instruments Incorporated, a corporation of Delaware, --; in the heading to the printed specification, lines 3, 4, and 5, for "assignor to Texas Instruments Incorporated, Attleboro, Mass., a corporation of Massachusetts" read -- assignor to Texas Instruments Incorporated, a corporation of Delaware --; in the printed specification, column 4, line 32, for "Line", both occurrences, read -- LINE --; same column 4, lines 36, 74, and 75, and column 5, line 4, for "Line", each occurrence, read -- LINE --; column 4, line 35, for "elertrical" read -- electrical --; column 5, line 24, for "thesmostat" read -- thermostat --; same column 5, lines 66 to 68, for "this point 128 representing the actual contact-opening temperature obtained in manufacturing" read -- (this point 128 representing the actual contact-opening temperature obtained in manufacturing), --.

Signed and sealed this 3rd day of May 1960.

(SEAL)
Attest:

KARL H. AXLINE
Attesting Officer

ROBERT C. WATSON
Commissioner of Patents